United States Patent [19]

Bihler et al.

[11] Patent Number: 4,566,706
[45] Date of Patent: Jan. 28, 1986

[54] EASY-ADJUST STAIR CLIMBER FOR WHEELCHAIR

[75] Inventors: Franz Bihler; Anton Abele, both of Augsburg, Fed. Rep. of Germany

[73] Assignee: Kleindienst GmbH, Augsburg, Fed. Rep. of Germany

[21] Appl. No.: 511,790

[22] Filed: Jul. 7, 1983

[30] Foreign Application Priority Data

Jul. 9, 1982 [DE] Fed. Rep. of Germany ....... 3225770

[51] Int. Cl.⁴ .......................... B62B 5/02; B62B 9/02; B62D 55/00; A61G 5/00
[52] U.S. Cl. .................................... 280/5.22; 180/8.2; 180/907; 280/242 WC; 280/289 WC; 280/DIG. 10; 403/330; 403/393; 410/51; 410/81
[58] Field of Search ...................... 280/5.22, 5.2, 5.32, 280/DIG. 10, 289 WC, 242 WC; 180/9.2 R, 907, 8.2; 410/3–10, 51, 52, 77, 81, 84; 414/451, 453, 455; 403/330, 393

[56] References Cited

U.S. PATENT DOCUMENTS

| | | | |
|---|---|---|---|
| 1,971,952 | 8/1934 | Townsend | 414/451 |
| 2,635,775 | 4/1953 | Ernst | 414/622 |
| 3,887,228 | 6/1975 | Ingerson | 280/242 WC X |
| 4,401,178 | 8/1983 | Studer | 280/5.22 X |
| 4,432,426 | 2/1984 | Misawa | 280/242 WC X |

FOREIGN PATENT DOCUMENTS

| | | | |
|---|---|---|---|
| 1150333 | 7/1983 | Canada | 280/5.22 |
| 2827377 | 1/1980 | Fed. Rep. of Germany | 410/7 |

Primary Examiner—Joseph F. Peters, Jr.
Assistant Examiner—Mitchell J. Hill
Attorney, Agent, or Firm—Karl F. Ross; Herbert Dubno

[57] ABSTRACT

An apparatus for moving a wheelchair having a pair of upright rear frame members has a support adapted to engage underneath the wheelchair in an upright condition of same with the chair pivotal on the support between erect and inclined positions. At least two endless tracks on the support carry same and the wheelchair thereon so that the tracks allow the wheelchair to move on an incline. A frame element pivotal on the support about a horizontal axis transverse to the tracks carries a vertically displaceable transverse mount having outer ends respectively juxtaposed with the wheelchair frame members. An adjustment spindle extending along and rotatable about a horizontal axis through the mount ends adjacent the frame members has oppositely threaded ends at the outer ends engaged in respective mounting blocks axially slidable in the outer mount ends and threaded on the adjustment-spindle ends. Thus rotation of the spindle in one direction about its axis moves the two blocks axially apart and opposite rotation moves them axially together. The mounting blocks are formed to fit with the respective wheelchair frame members so that the blocks can be moved together and apart by means of the spindle to fit to chairs of different sizes. Respective clips are pivotal on the blocks between holding positions securing the respective wheelchair frame members in the respective seats and releasing positions out of engagement with the respective wheelchair frame members.

4 Claims, 5 Drawing Figures

U.S. Patent Jan. 28, 1986 Sheet 3 of 3 4,566,706
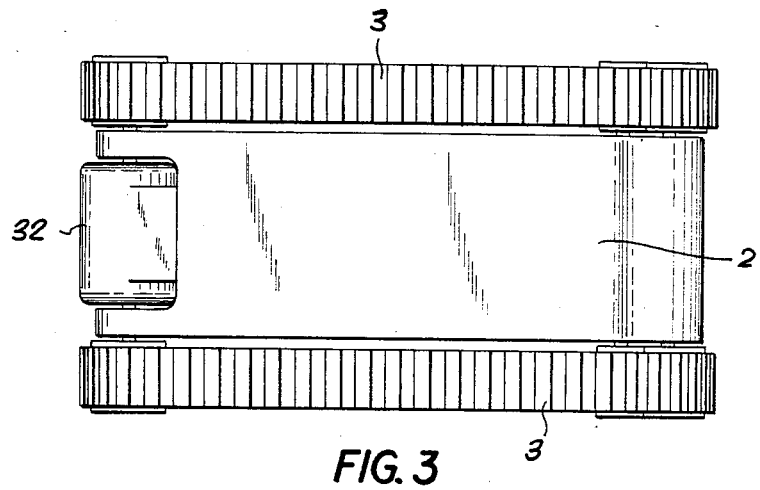
FIG. 3
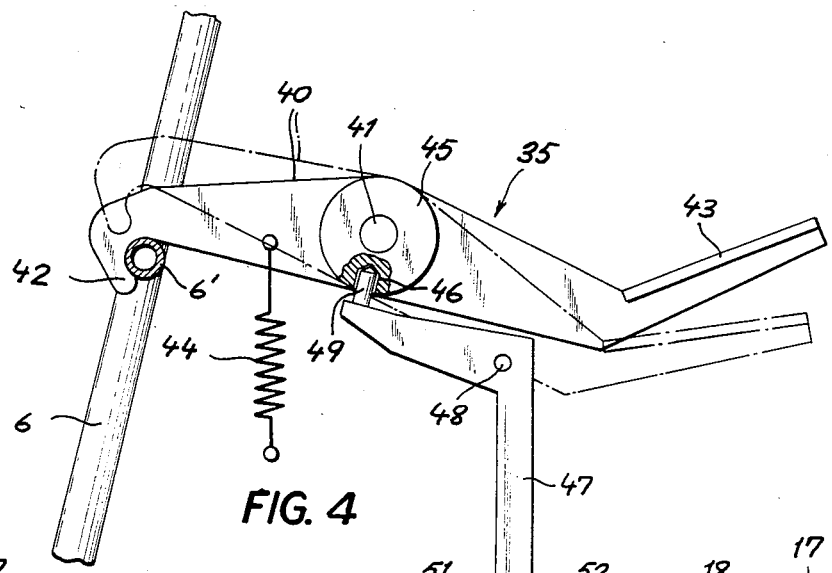
FIG. 4
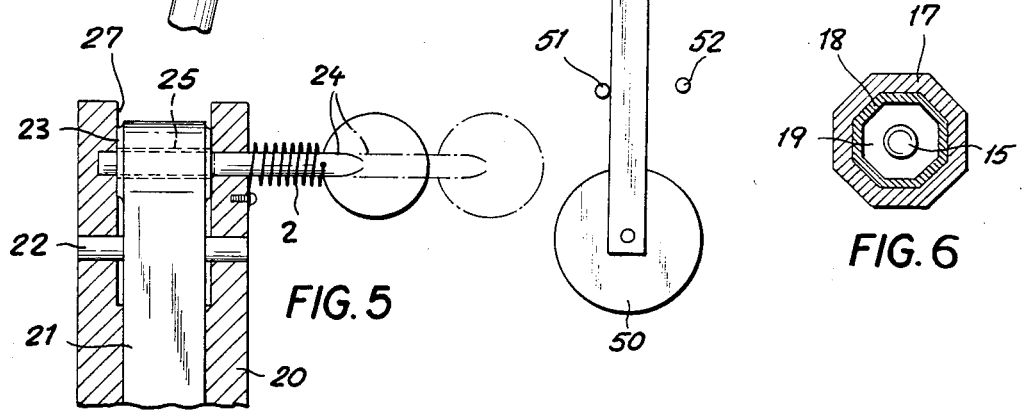
FIG. 5
FIG. 6

EASY-ADJUST STAIR CLIMBER FOR WHEELCHAIR

FIELD OF THE INVENTION

The present invention relates to a stair-climbing apparatus for a wheelchair or the like. More particularly this invention concerns such a stair climber which can be adjusted to accommodate different sizes of chairs.

BACKGROUND OF THE INVENTION

An apparatus for moving a wheelchair on a flight of steps has a support adapted to engage underneath the wheelchair in an upright condition of same with the chair pivotal on the support between erect and inclined positions. Two or more endless tracks on the support carry same and the wheelchair thereon so that the tracks allow the wheelchair to move over uneven terrain and up and down stairs. A latch is displaceable on the support between a holding position securing the wheelchair in the inclined position and a freeing position permitting the wheelchair to move freely between its positions. The latch is provided with a pedal to displace it into the freeing position. The support inclines a frame element pivotal on the support about a horizontal axis transverse to the tracks and a device for securing the frame element to the wheelchair on the support.

As disclosed in our copending patent application Ser. No. (511,791 filed July 7, 1983) a safety device connected to the latch is responsive to the inclination of the tracks relative to the horizontal for blocking the latch from moving into the freeing position when the tracks are inclined at more than a predetermined angle to the horizontal. Thus the wheelchair cannot be released from the support when same is moving on an incline.

Wheelchairs differ considerably in size, so it is necessary to be able to adjust the position of the securing means that connect the frame element to an element of the chair. Thus it is standard to provide two independent clips that are movable horizontally and vertically on a frame element of the support. For adjustment it is necessary to reposition both of the clips and secure them in place on the support, then connect them to the frame of the wheelchair. This is an onerous job that is often not carried out carefully so the clips do not securely grip the wheelchair frame.

In addition these systems require both of the clips to be adjusted horizontally when a narrower or wider chair is being engaged since the chair should be centered in the stair climber. Unfortunately this extra work is frequently not done, that is only one clip is adjusted. The result is offcenter positioning of the chair which can make the climber excessively tippy and potentially quite dangerous. Even a conscientious operator often misjudges the precise centered position of the chair being carried and maladjusts the system.

OBJECTS OF THE INVENTION

It is therefore an object of the present invention to provide an improved stair-climbing apparatus for a wheelchair or the like.

Another object is the provision of such a wheelchair stair-climbing apparatus which overcomes the above-given disadvantages, that is which is easy to adjust.

A further object is the provision of a stair climber in which the load, normally a wheelchair, is always perfectly centered.

SUMMARY OF THE INVENTION

An apparatus for moving a wheelchair having a pair of upright rear frame members according to the invention has a support adapted to engage underneath the wheelchair in an upright condition of same with the chair pivotal on the support between erect and inclined positions. At least two endless tracks on the support carry same and the wheelchair thereon so that the tracks allow the wheelchair to move on an incline. A frame element pivotal on the support about a horizontal axis transverse to the tracks carries a vertically displaceable transverse mount having outer ends respectively juxtaposed with the wheelchair frame members. An adjustment spindle extending along and rotatable about a horizontal axis through the mount ends adjacent the frame members has oppositely threaded ends at the outer ends engaged in respective mounting blocks axially slidable in the outer mount ends and threaded on the adjustment-spindle ends. Thus rotation of the spindle in one direction about its axis moves the two blocks axially apart and opposite rotation moves them axially together. The mounting blocks are formed to fit with the respective wheelchair frame members so that the blocks can be moved together and apart by means of the spindle to fit to chairs of different sizes. Respective clips are pivotal on the blocks between holding positions securing the respective wheelchair frame members in the respective seats of the blocks and releasing positions out of engagement with the respective wheelchair frame members.

With this system, therefore, both blocks are adjusted simultaneously, reducing by half this part of the adjustment operation. In addition they will inherently be positioned symmetrically with respect to the center since according to this invention the spindle is not displaceable along its axis on the climber support.

The apparatus according to this invention also has, as described in our above-cited application, latch means on the support displaceable between a holding position for securing the wheelchair in the inclined position and a freeing position for permitting the wheelchair to move freely between its positions. In addition means is provided for arresting the transverse mount at any of a plurality of vertically offset locations along the frame element.

According to yet another feature of this invention each of the mounting blocks is formed with a seat complementarily receiving the respective wheelchair frame member. Normally the seat is part-cylindrical to fit a cylindrical frame member. Means is also provided for securing the clips in the holding positions. Thus each of the clips is pivotal on the respective mounting block about an upright axis and the securing means for the clips includes respective pins parallel to and offset from the respective upright clip axes. The pins are axially displaceable into and out of engagement with the respective clips.

In accordance with another feature of this invention, the transverse mount is formed at least partially with a pair of passages of noncylindrical shape extending along the spindle axis and each mounting block includes a part of complementary noncylindrical shape received in a respective passage, axially slidable therein, and threaded to the respective spindle end.

Although the discussion above relates to a wheelchair, it is understood that the system of this invention is equally usable with other load carriers. A baby carriage, sales wagon, loaded pallet, or hand truck could also be used without leaving the scope of the invention.

DESCRIPTION OF THE DRAWING

The above and other features and advantages will become more readily apparent from the following, reference being made to the accompanying drawing in which:

FIG. 3 is a bottom view of the apparatus of FIG. 1;

FIG. 4 is a sectional view taken along line IV—IV of FIG. 2; and

FIG. 5 is a sectional view taken along line V—V of FIG. 2.

SPECIFIC DESCRIPTION

Figure 1:
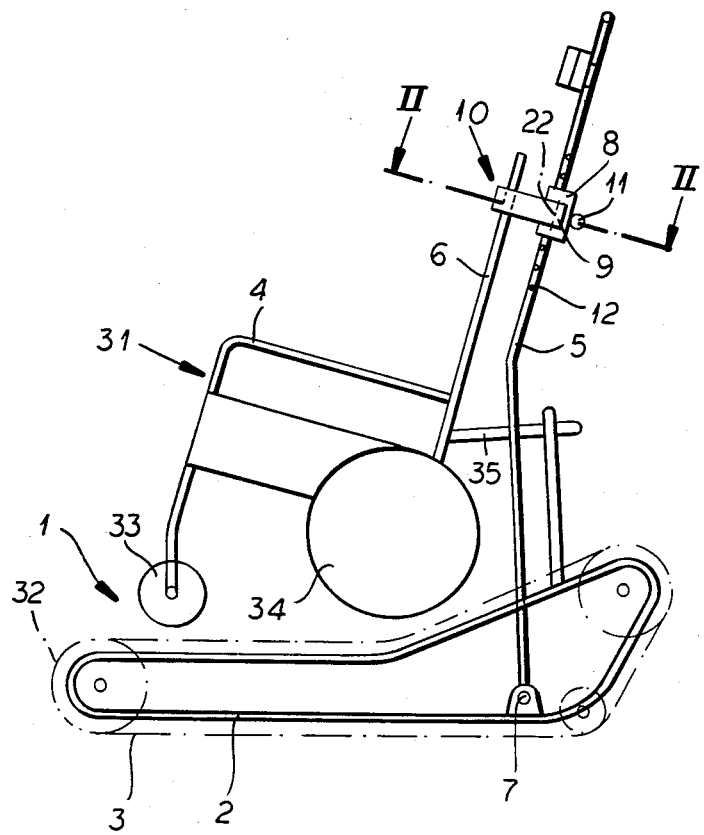
FIG. 1 is a partly schematic side view of the apparatus of this invention.

As seen in FIG. 1 a wheelchair 31 has a frame 4 and can be carried on an L-shaped support 2 carried in turn on a pair of endless tracks or chains 3 that are driven by means of a motor 32 to form a stair climber 1. The support 2 is formed as a guide for the wheels 33 and 34 of the chair 31, normally with wide front-to-back grooves extending in the travel direction and parallel to the plane of the view of FIG. 1.

Pivoted on the support 2 at a horizontal axis 7 perpendicular to the travel direction is a frame element 5 that can be secured to a frame member 6 of the chair 31 by a coupling 10 described in more detail below. A latch 35, shown in diagrammatic form in FIG. 1, can hook onto the wheelchair frame 4 to secure same in a tipped-back position in the manner of our above-identified copending patent application.

In use, as is known, the wheelchair 31 is backed up on the guide of the support 2 so that the front wheels 33 and rear wheels 34 of the chair 31 sit thereon. This is done at the top or bottom of a flight of stairs or incline. The couplings 10 are then engaged to lock the frame members 6 to the members 5.

To climb the stairs the chair 31 is then tipped back on its rear wheels 34 from the FIG. 1 position and the latch 35 is engaged to hold it in this tipped-back position, in which the entire system is stable both on the level and on a slope. The support 2 can then climb the stairs by means of the tracks 3 driven by the motor 32.

Figure 2:
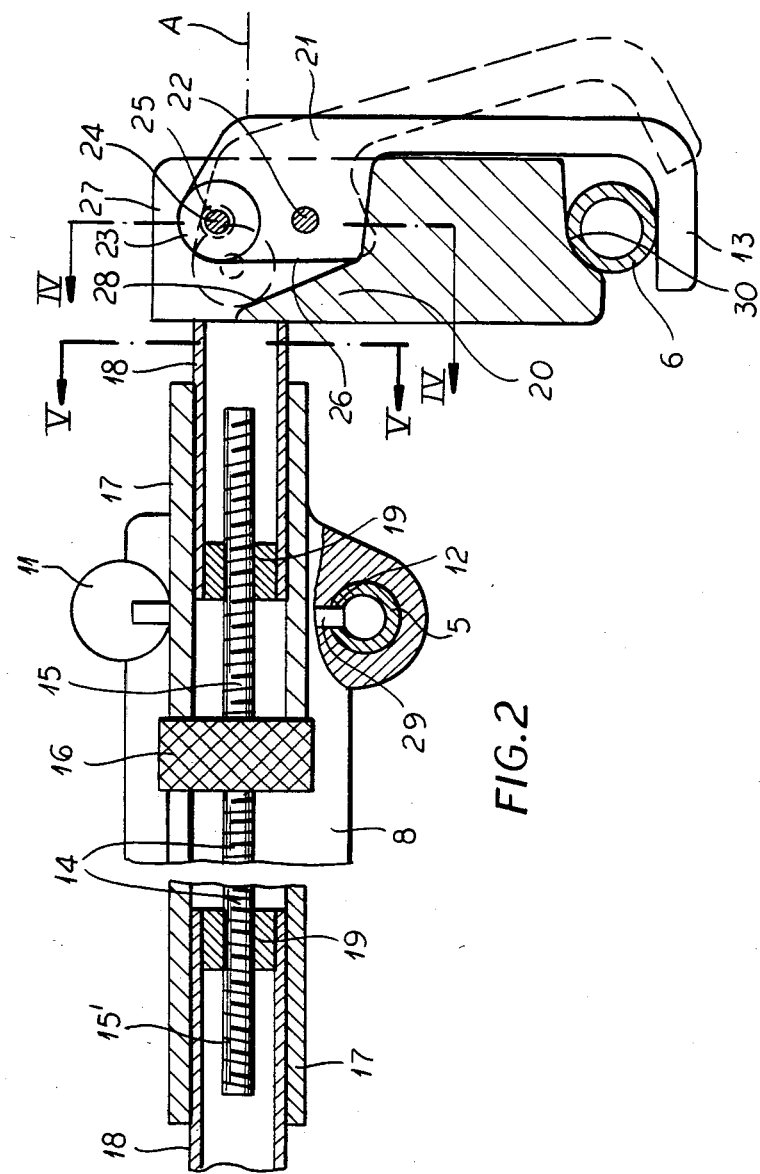
FIG. 2 is a section taken generally along line II—II of FIG. 1.

According to this invention the couplings 10 are carried on a single traverse bar or tranverse mount 8 extending between the two frame members 5, each of which is formed with succession of holes 12. Respective spring-loaded pins 11 carried in the bar 8 at each member 5 have tips 29 engageable in the holes 12 as shown in FIG. 2 to lock the mounting bar 8 at any of a plurality of vertically offset locations along the members 5.

At each lateral end the mount 8 is provided with an octagonal-section sleeve 17 centered on a horizontal axis A perpendicular to the travel direction of the climber 1 and each having an octagonal-section passage receiving an octagonal-section inner sleeve or tube 18 that can slide axially in it but not rotate about the axis A relative to the outer sleeve 17. A spindle 14 extending along the axis A has oppositely threaded ends 15 and 15' engaged in nuts 19 fixed in the inner ends of the respective inner sleeves 18. This spindle 14 is provided with a pair of adjustment wheels 16 that cannot rotate relative to it and that are axially fixed on it immediately adjacent the inner ends of the respective tubes 17. Thus the spindle 14 cannot move along its axis A on the transverse mount 8. Rotation of these wheels 16 in one direction therefore moves the two sleeves 18 apart and rotation in the opposite direction moves them toward each other.

Each inner sleeve 18 carries at its outer end a mounting block 20 having a front end formed with a cutout of seat 30 adapted to fit complementary behind the respective wheelchair-frame member 6. A pivot 22 extends vertically through a cutout 27 in the rear end of the mounting block 20 and carries a clip 21 having an L-shaped front end 13 that can engage around the respective member 6.

The rear end of this clip 21, that is its part to the rear side of the pivot 22, is formed as a boss 23 having a throughgoing bore 25 parallel to the pivot 22 and capable of receiving in the solid-line latched position a spring-loaded pin 24 carried in the block 20. The cutout 27 of the block 20 is defined in part by a web having a surface 28 against which a face 26 of the clip can engage in a dashed-line open slip position. In this open position the pin 24 projects up out of the body 20 as shown in phantom lines in FIG. 5 to give a clear visual indication of the position.

In use the height of the two couplings 10 is adjusted by moving the bar 8 up or down to a position adjacent the upper ends of the members 6, and then is locked in place by means of the pins 11. Then the adjustment wheel 16 is rotated to move the two blocks 20 into a position snugly fitting with the respective seats 30 against the respective frame members 6.

Thereupon the clips 21 are pivoted in from their dashed-line position of FIG. 2 to their solid-line position. This brings the ends 13 ahead of the members 6 and locks these members 6 in place in the seats 30. Once fully in the closed position, the pins 24 are biased by tension spring 24' into the holes 25 of the clips 21, securing them in place and allowing the pins 24 to move into place, indicating successful closure.

To release the wheelchair 31 the two pins 24 are pulled out and the clips 21 are pivoted out. This operation does not change the adjustment for the spacing between the frame members 6 or the height position thereof, so that for a subsequent use with the same chair or one of the same size the system need not be readjusted.

Any readjustment will automatically center the chair 31 on the support 2 for maximum stability, and only requires a single adjustment member to be actuated to adjust both couplings 20. The system is therefore very easy to use and safe.

We claim:

1. An apparatus for moving a wheelchair having a pair of upright rear frame members, the apparatus comprising:
    a support adapted to engage underneath the wheelchair in an upright condition of same, the wheelchair being pivotal on the support between erect and inclined positions;
    two endless tracks on the support and supporting same and the wheelchair carried thereon, whereby the tracks allow the wheelchair to move on an incline;
    a frame element pivotal on the support about a horizontal axis transverse to the tracks;
    a transverse mount vertically displaceable on the frame element and having outer ends respectively juxtaposed with the wheelchair frame members;

an adjustment spindle extending along and rotatable about a horizontal axis through the mount ends adjacent the frame members and having oppositely threaded ends at the outer ends;

respective mounting blocks axially slidable in the outer mount ends and threaded on the adjustment-spindle ends, whereby rotation of the spindle in one direction about its axis moves the two blocks axially apart and opposite rotation moves them axially together, the mounting blocks being formed with seats to fit with the respective wheelchair frame members, whereby the blocks can be moved together and apart by means of the spindle to fit to chairs of different sizes;

respective clips pivotal on the blocks about respective upright axes between holding positions securing the respective wheelchair frame members in the respective seats and releasing positions out of engagement with the respective wheelchair frame members, and respective means for securing the clips in the holding positions, the securing means including respective spring-loaded pins parallel to and offset from the respective upright clip axes, the pins being axially displaceable into and out of engagement with the respective clips.

2. The wheelchair-moving apparatus defined in claim 1, further comprising:

means for arresting the transverse mount at any of a plurality of vertically offset locations along the frame element.

3. The wheelchair-moving apparatus defined in claim 1 wherein each of the mounting blocks is formed with a seat complementarily receiving the respective wheelchair frame member.

4. The wheelchair-moving apparatus defined in claim 1 wherein each of the mounting blocks is formed at least partially with a passage of noncylindrical shape extending along the spindle axis, each mounting block including a part of complementary noncylindrical shape received in the respective passage, and threaded to the respective spindle end.

* * * * *